(12) United States Patent
Harriman et al.

(10) Patent No.: US 8,924,611 B2
(45) Date of Patent: Dec. 30, 2014

(54) PROVIDING A SERIAL PROTOCOL FOR A BIDIRECTIONAL SERIAL INTERCONNECT

(75) Inventors: David J. Harriman, Portland, OR (US); Jeff Morriss, Cornellus, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 13/532,962

(22) Filed: Jun. 26, 2012

(65) Prior Publication Data
US 2013/0346656 A1    Dec. 26, 2013

(51) Int. Cl.
*G06F 11/10*    (2006.01)
*H04L 1/00*    (2006.01)

(52) U.S. Cl.
CPC .................. *H04L 1/0061* (2013.01)
USPC ............................ 710/105; 710/313; 714/799

(58) Field of Classification Search
CPC ....... G06F 11/085; G06F 11/10; G08C 25/00; H04L 1/0061
USPC ......................... 710/105, 313; 714/799, 823
See application file for complete search history.

(56) References Cited

U.S. PATENT DOCUMENTS

| | | | |
|---|---|---|---|
| 5,396,376 A * | 3/1995 | Chambors et al. | ........... 360/48 |
| 6,009,488 A | 12/1999 | Kavipurapu | |
| 7,769,883 B2 | 8/2010 | Harriman et al. | |
| 7,782,805 B1 | 8/2010 | Belhadj et al. | |
| 7,949,794 B2 | 5/2011 | Ajanovic et al. | |
| 2005/0078614 A1 | 4/2005 | Haartsen | |
| 2006/0023633 A1 | 2/2006 | Caruk et al. | |
| 2006/0184809 A1 | 8/2006 | Kojou et al. | |
| 2007/0239900 A1 | 10/2007 | Beasley et al. | |
| 2008/0084836 A1 * | 4/2008 | Baird et al. | ................ 370/311 |
| 2008/0233912 A1 | 9/2008 | Hunsaker et al. | |
| 2008/0235528 A1 | 9/2008 | Kim et al. | |
| 2009/0310699 A1 | 12/2009 | Kodama | |
| 2010/0014541 A1 | 1/2010 | Harriman et al. | |
| 2010/0081406 A1 | 4/2010 | Tan | |
| 2010/0332868 A1 | 12/2010 | Tan et al. | |
| 2011/0016373 A1 * | 1/2011 | Teruyama et al. | ............ 714/799 |
| 2011/0060931 A1 | 3/2011 | Radhakrishnan et al. | |
| 2011/0087952 A1 * | 4/2011 | Marin et al. | ................ 714/792 |
| 2013/0346635 A1 * | 12/2013 | Morriss et al. | ................. 710/5 |

FOREIGN PATENT DOCUMENTS

WO    WO 01-72067    9/2001

OTHER PUBLICATIONS

MPI Alliance, "MIPI Alliance Launches New M-PHY and UniPro Specifications for Mobile Device Applications," Jun. 10, 2011, 1 page.
MPI Alliance, "Physical Layer Specifications, MIPI Alliance Launches M-PHY v1.0 + UniPro v1.40 Specifications," 2012, 3 pages.

(Continued)

*Primary Examiner* — Glenn A Auve
(74) *Attorney, Agent, or Firm* — Trop, Pruner & Hu, P.C.

(57) ABSTRACT

In one embodiment, the present invention includes a host controller with transmit logic to prepare data into a data packet for communication along an interconnect and to transmit the data packet. This data packet may include a preamble portion having a first predetermined value, a content portion including the data and having a plurality of symbols each including a start bit separate from the data, an error detection portion including an inverted version of the content portion, and a postamble portion having a second predetermined value. Other embodiments are described and claimed.

20 Claims, 6 Drawing Sheets

(56) References Cited

OTHER PUBLICATIONS

Intel Corporation, "An Introduction to the Intel QuickPath Interconnect," Jan. 2009, pp. 1-22.

U.S. Appl. No. 13/477,310 entitled, "Optimized Link Training and Management Mechanism," filed May 22, 2012, by Mahesh Wagh, et al.

U.S. Appl. No. 13/477,304 entitled, "Providing a Consolidated Sideband Communication Channel Between Devices," filed May 22, 2012, by David Harriman, et al.

U.S. Appl. No. 13/477,322 entitled, "Providing a Load/Store Communication Protocol With a Low Power Physical Unit" filed May 22, 2012, by Sridharan Ranganathan, et al.

Intel Technology Journal, "The Emergence of PCI Express in the Next Generation of Mobile Platforms," Feb. 17, 2005, 16 pages.

International Searching Authority, "Notification of Transmittal of the International Search Report and the Written Opinion of the International Searching Authority," mailed Oct. 18, 2013, in International application No. PCT/US2013/046460.

* cited by examiner

US 8,924,611 B2

PROVIDING A SERIAL PROTOCOL FOR A BIDIRECTIONAL SERIAL INTERCONNECT

BACKGROUND

Many devices both within and external to a computing device can be connected via a serial link such as in accordance with a given universal serial bus (USB) specification. Originally, USB technology provided for communications at relatively low bit rates, e.g., beginning at 1.5 megabits per second (Mbits/s) and then expanding to 12 Mbits/s and higher. With the most recent of the USB specification, Universal Serial Bus Revision 3.0 Specification (Nov. 17, 2008), a maximum transmission speed of up to 5 gigabits per second is specified.

While high data rates are available with existing USB technologies, certain drawbacks exist. These include the voltage signaling requirements which are currently at 3.3 volts (with a 5.0 volt tolerance) which may not be compatible with advanced technology node silicon processes. In addition, USB communications are not power optimized, and the proliferation of use of USB connections for internal devices unnecessarily consumes available pins within a system.

DETAILED DESCRIPTION

Figure 1:
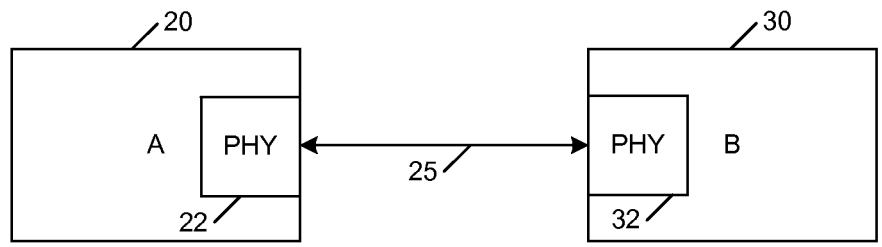
FIG. 1 is a block diagram of a pair of devices coupled via an interconnect in accordance with an embodiment of the present invention.

Referring now to FIG. 1, shown is a block diagram of a pair of devices coupled via an interconnect in accordance with an embodiment of the present invention. As shown in FIG. 1, system 10 includes a first device 20 coupled to a second device 30 via an interconnect 25. In an embodiment, first device 20 may correspond to a main processor of a system such as a system-on-a-chip (SoC), while second device 30 may be a peripheral device such as one of multiple sensors or other low data rate devices.

In the embodiment of FIG. 1, interconnect 25 may be a low power serial (LPS) interconnect having a protocol that will be described further herein. In various embodiments, this interconnect may be of a relatively low overhead and reduced complexity protocol to enable operation at low power, e.g., at a level much less than other serial interconnects such as a universal serial bus (USB) interconnect. Embodiments may be appropriate for general-purpose low or mid-performance communications, such as providing of sensor data, configuration information, or so forth at data rates of less than approximately 1 gigabits per second (Gbps) for point-to-point or appropriately terminated connections, and in the range of between approximately 10-100 Mbps for unterminated connections. In other embodiments, this type of interconnect may be used as a sideband mechanism to provide sideband management of a separate link.

As further seen in FIG. 1, each device may include a physical unit (PHY) to provide for encoding and handling of transmission/reception via interconnect 25. As seen, first device 20 may include a PHY 22 and second device 30 may include a PHY 32.

To provide for communication at low power, embodiments may provide a wire protocol of relatively reduced complexity. This protocol may have various elements including: providing of bus idles between packets, even if the same master communicates multiple packets (thus simplifying receiver complexity); a preamble for purposes of bit locking; a postamble at a transmission end to provide for returning to an idle state of the link to thus enable the receiver to explicitly recognize the end of a transmission without higher-level mechanisms; and providing a predetermined encoding for data communication such as an encoding according to an 8 bit/9 bit (8 b/9 b) encoding to enable ease of identification of various information of a packet.

In an embodiment this 8 b/9 b encoding may be as follows: for each data byte of 8 bits, an additional start bit may be provided. This start bit may be of alternating value (e.g., zero then one). Note that in some embodiments this alternating pattern is not followed for a last byte of a data portion of the packet to mark the last byte before a postamble portion of the packet.

Figure 2:
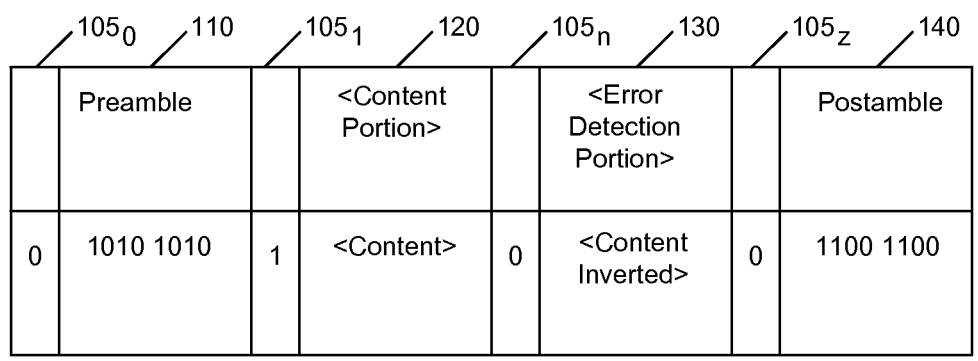
FIG. 2 is a block diagram of a packet in accordance with an embodiment of the present invention.

Referring now to FIG. 2, shown is a block diagram of a packet 100 in accordance with an embodiment of the present invention. As seen in FIG. 2, packet 100 details a protocol of a packet format for communication on a LPS interconnect. In general, packet 100 may be of a relatively limited length as a message portion of the packet can be of relatively small length, e.g., in some embodiments between approximately 1 to 64 bytes.

As seen, packet 100 can begin with a start bit $105_0$, which is one of multiple start bits $105_0$-$105_z$, each of which can be interspersed throughout the packet to thus accommodate the 8 b/9 b encoding of information in the packet. After this start bit, a preamble portion 110 may be provided. This preamble portion may be of a predetermined value, such as the series of alternating logic one and logic zero bits shown in FIG. 2 to thus enable a receiver to identify a beginning of the packet. This is particularly so, since using an open drain-type connection and a pull-up resistor coupled to the interconnect, potentially long periods of a logic one value may be present on the interconnect prior to transmission of a given packet.

As further seen in FIG. 2, after preamble portion 110, a second start bit $105_1$ may be present. As seen, this start bit is of an alternating value to first start bit $105_0$. Thereafter, a content portion 120 may be provided that can be formed of a length that may be predetermined (or can be determined based on the communication itself). In various embodiments, this content portion 120 may include a first initiating 8-bit block (to thus form a 9 bit block with start bit $105_1$) and one or more (and potentially zero) succeeding 9 bit blocks. In an embodiment, each of these blocks of 9 bits can be referred to as a symbol.

After the content portion 120, another start bit $105_n$ may be provided. Note that it is assumed that content portion 120 includes, in FIG. 2, an odd number of 9-bit symbols as this succeeding start bit $105_n$ is of zero value.

Thereafter, an error detection portion 130 may be provided within the packet. This error detection portion can be an inverted or one's complement version of content portion 120, and as will be described further below, can be used by the receiver for purposes of detecting an error in communication. Finally, a terminal start bit $105_z$ is provided and thereafter a postamble portion 140 occurs, which again may be of a predetermined value, such as a repeating 4 bit pattern of logic ones and zeros as seen in FIG. 2.

Although not shown for ease of illustration, understand that after communication of this packet, the interconnect may return to a logic high level until a next packet is communicated, given the open drain configuration and the pull-up resistor present and coupled to the interconnect. Also note that while shown with this particular implementation of a packet for purposes of illustration, understand that other packet types are contemplated for other embodiments. For example, different values of the preamble and postamble portions may be present. Furthermore, different alternating or other patterns for the start bits may be provided. Still further, different arrangements of the content and error detection portions may also be present in some embodiments. Note further that in some implementations, some type of scrambling of the data information may be provided for purposes of electromagnetic interference (EMI) reduction. Other possibilities exist such as providing for a defined address portion and so forth.

Note also that in various embodiments, content portion 120 may include, at a beginning portion, a unique identifier of the sender of the packet, which can be implemented via a unique address that can be statically or dynamically determined. By way of this unique identifier provided within the content portion (and thus within each packet communicated) it can be guaranteed that colliding packets will be detected, even in the case where both components start transmitting at the same time.

In some embodiments, arbitration between components coupled via such an interconnect may be performed using collision detection in which each component can attempt to transmit a packet and monitor for collisions on the interconnect. Accordingly, the PHY present in each component coupled to such an interconnect may provide for collision detection, e.g., via an open drain connection.

In some embodiments a protocol for this interconnect may provide certain parameters such as minimum idle/turnaround time between transmissions. For example in an embodiment, for an acknowledgment-type response a turnaround time of one symbol time (which as discussed above may correspond to a 9-bit portion) may occur. And for a return to an idle state, a minimum of 1 symbol time may occur.

In some embodiments, retry mechanisms may also be provided. For example, in an implementation providing for such a retry mechanism, if there is no acknowledgment received when expected, the transmitter may perform a retry transmission after a predetermined number of symbol times if it is the host or upstream device, or after a second, e.g., longer predetermined number of symbol times if it is the target or downstream device. In one such embodiment, the host-based retry mechanism may occur after between approximately 11 and 17 symbols without receipt of an expected acknowledgement, and the receiver-based retry mechanism may occur after between approximately 31 and 43 symbols without receipt of an expected acknowledgement. In other embodiments, such retry mechanisms may occur after another interval as dictated by an upper level protocol. In general, a retry timer may be set to be greater than X, where X is the expected time within an acknowledgment is to be received. Note also that the values may depend on a largest packet size. Note also that the different and non-overlapping windows in different directions may ensure that repeated collisions are avoided.

Figure 3:
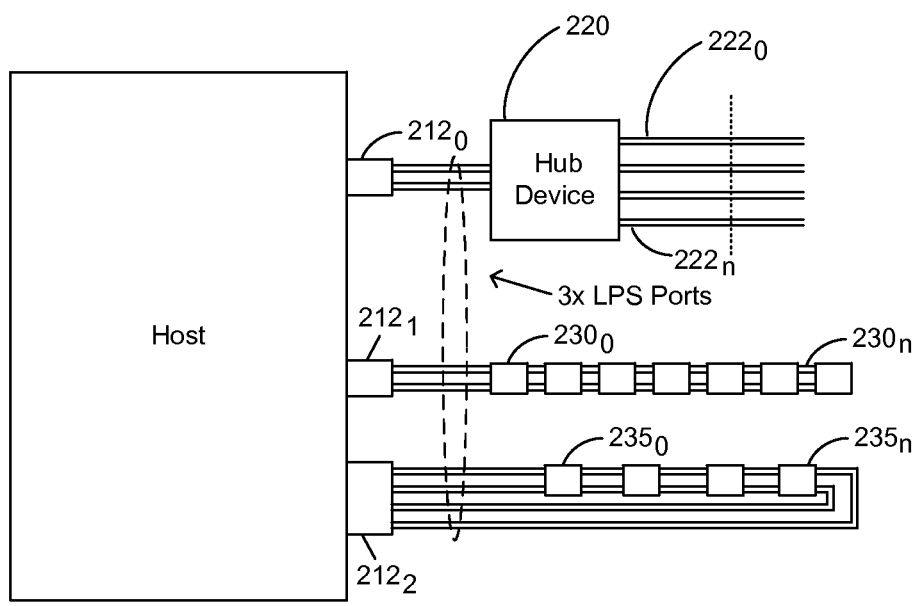
FIG. 3 is a block diagram of a connection of devices to a host controller in accordance with an embodiment of the present invention.

Referring now to FIG. 3, shown is a block diagram of a connection of devices to a host controller in accordance with an embodiment of the present invention. As shown in FIG. 3, system 200 may be part of a computing system, such as a given personal computer (PC)-based system, server system or so forth. In some embodiments, a system may be a portable device such as a laptop or notebook computer, Ultrabook™, smartphone, tablet computer or so forth. As seen, system 200 includes a host controller 210 that acts as a host for one or more LPS interconnects in accordance with an embodiment of the present invention. As shown in FIG. 3, host controller includes three LPS ports $212_0$-$212_2$. Although shown with this limited number of ports for purposes of illustration, understand the scope of the present invention is not limited in this regard. Each port may provide for communication via a link in a bidirectional manner. More specifically, the communication can be of data and clock information, e.g., bidirectional differential data and a differential clock signal.

As seen, first port $212_0$ couples to a hub device 220. In various embodiments, device 220 may be a hub device to enable conversion and interfacing between LPS host controller 210 and devices according to another interconnect protocol such as USB devices (e.g., USB2 devices). As such, hub 220 may provide, in addition to conversion of data information between the different protocols, voltage conversion, e.g., from signals having a 1.0 volt system operation via the LPS links to 3.3 volt signals for communication via USB2. As seen, hub 220 can include a plurality of ports (e.g., ports $222_0$-$222_n$) that can be provided as ports to external devices or internal devices.

Also seen in FIG. 3, second port $212_1$ of host controller 210 may provide for communication with a plurality of LPS devices $230_0$-$230_n$. These devices 230 may be of relatively low speed operation (e.g., less than approximately 100 Mbps) via a multi-drop bus having differential data and clock links. Furthermore, to provide for communications at higher speeds with higher speed devices, a separate port $212_2$ may communicate with higher speed LPS devices $235_0$-$235_n$ (in that these devices may operate at speeds greater than approximately 100 Mbps).

Note that host controller 210 may be enabled to provide for support of bridging of LPS and legacy devices for compatibility (such as USB2 devices). In an embodiment, host controller 210 may reuse a USB2 protocol stack and retain a USB programming model, while operating at a lower power level, e.g., due to voltage rails operating at a lower voltage (e.g., one volt). In this way, substantially lower active and idle power can be realized, along with a reduced pin count, as the LPS interconnect may act as a multi-drop bus.

Figure 4:
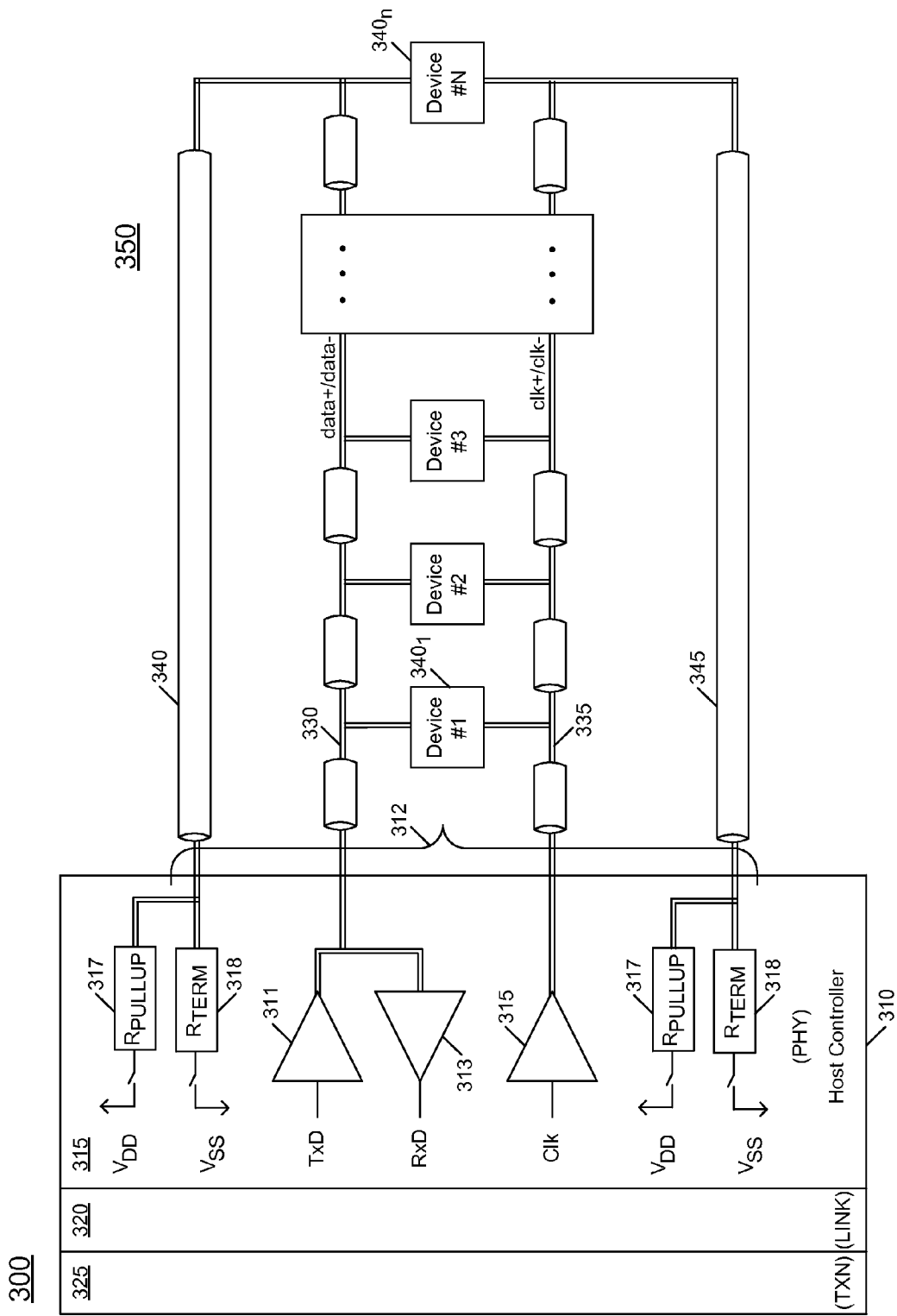
FIG. 4 is a block diagram showing further details of coupling of a host controller to a multi-drop interconnect in accordance with an embodiment of the present invention.

Referring now to FIG. 4, shown are further details of coupling of a host controller to a multi-drop interconnect in accordance with an embodiment of the present invention. As shown in FIG. 4, system 300 may include a host controller 310 that couples to a plurality of devices $340_1$-$340_n$ via a LPS interconnect 350 (generally). As seen, LPS interconnect 350 may provide for a differential data link 330, a differential clock link 335 and termination/pull up links 340 and 345.

By providing a multi-drop interconnect structure, a plurality of individual devices can be coupled to host controller 310. In various embodiments up to eight and possibly greater amounts of devices may be coupled in a multi-drop fashion. In the embodiment shown, clock and data communication may be differential, with data communicated in a bidirectional, half duplex manner. The arrangement may be controlled by host controller 310 and can be of DC-coupled connection.

As seen in detail in FIG. 4, host controller 300 may include transmit (and receive) logic having a plurality of layers including a PHY unit 315, a link layer 320, and a transaction layer 325. Transaction layer 325 may generate packets according to the serial protocol described above, e.g., in regard to FIGS. 1 and 2, and provide them to link layer 320, where the error detection portion of the packet can be inserted to thus provide a completed packet to host controller PHY unit 310 for communication via LPS interconnect 350.

In a transmit direction, such serial data packets may be communicated differentially via a transmit driver 311 via differential signal link 330, which as seen may be coupled to each of devices $340_1$-$340_n$. In turn, a clock signal, which may be generated on or off die, can be communicated through a clock driver 315 and driven differentially via differential clock link 335 to the plurality of devices. As further seen, termination and pull up impedances can be coupled to links 340 and 345 under control of host controller 310. More specifically, by way of controlling switches, a supply voltage can be coupled to a given one of these links via a corresponding pull up resistance 317. And similarly, via selective coupling of a switch, a reference voltage (e.g., a ground voltage) can be coupled to a given one or more of these links via a corresponding termination resistance 318.

As further seen, incoming data to host controller 310 may be provided to a receive buffer 313 to thus communicate serially received information to the upper layers of host controller 310. Although shown at this high level in the embodiment of FIG. 4, understand the scope of the present invention is not limited in this regard.

Figure 5:
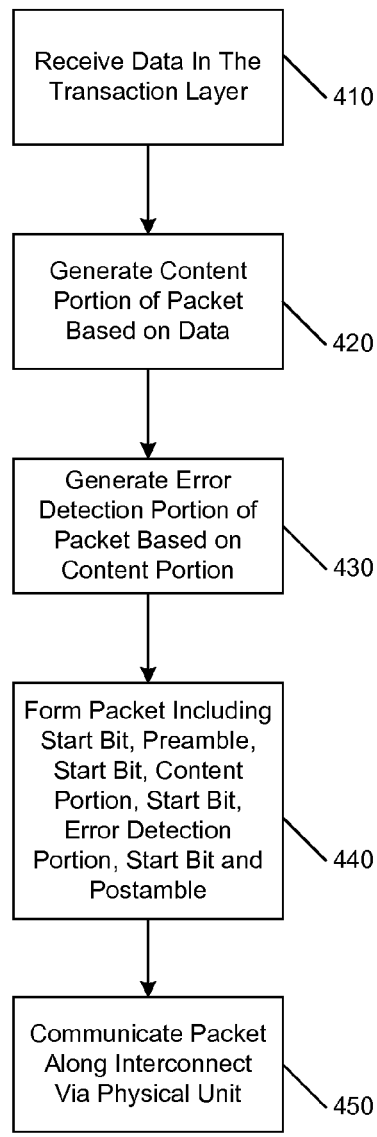
FIG. 5 is a flow diagram of a method in accordance with an embodiment of the present invention.

Referring now to FIG. 5, shown is a flow diagram of a method in accordance with an embodiment of the present invention. As shown in FIG. 5, method 400 may be performed in transmitter logic of a host controller or other device to generate a packet for transmission along an interconnect. As seen in FIG. 5, method 400 may begin by receiving data in a transaction layer (block 410). For example, a processing unit such as a core, an intellectual property (IP) logic or other such processing unit may generate data to be communicated and provide the data to a transmit logic, and more specifically to a transaction layer of this logic, in one embodiment. Next, at block 420 a content portion of the packet can be generated based on the data received (block 420). This content portion can be generated by preparing a symbol for each data byte by adding an additional start bit of an alternating pattern of logic low and high values to the data byte to thus obtain a series of one or more symbols. Next, an error detection portion of the packet can be generated based on this content portion (block 430). In one embodiment, this error detection portion can be generated by taking the one's complement of the data portion. However, other types of error detection mechanisms are contemplated such as cyclic redundancy check (CRC) and/or error detection and correction codes (EDCC).

Still referring to FIG. 5, next at block 440 a packet can be formed. In the embodiment shown, this packet can include a start bit, a preamble, another start bit (which may of opposite polarity to the first start bit), the content portion, another start bit (which can be of opposite polarity to the last start bit within the content portion), the error detection portion, a final start bit (which again can be of an opposite polarity to the final start bit within the error detection portion), and a postamble. Finally at block 450 this packet can be communicated along an interconnect via a physical unit of the transmitter logic. Although shown at this high level in the embodiment of FIG. 5, understand the scope of the present invention is not limited in this regard.

Figure 6:
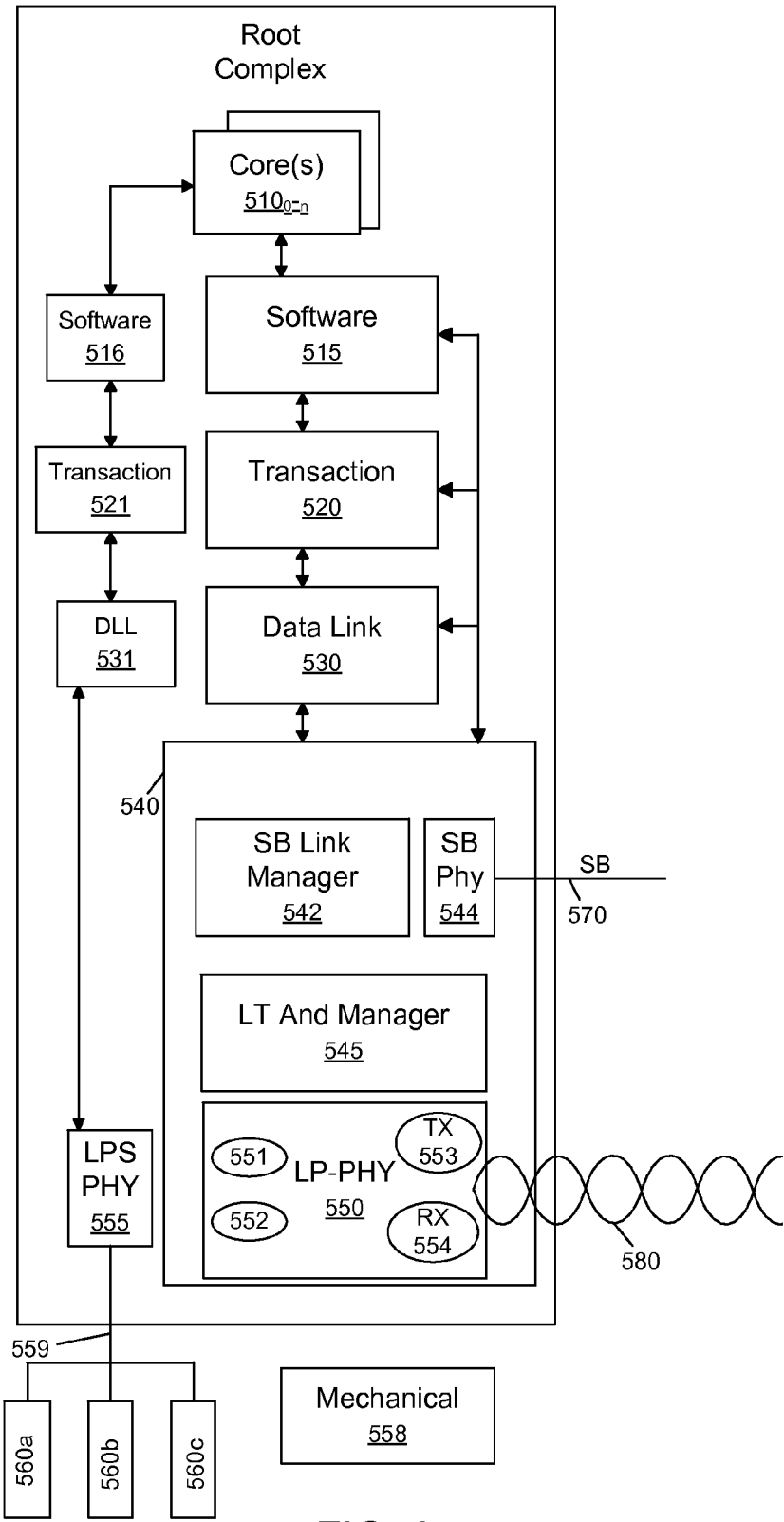
FIG. 6 is a block diagram of a system-on-a-chip (SoC) in accordance with an embodiment of the present invention.

Referring now to FIG. 6, shown is a block diagram of a SoC in accordance with an embodiment of the present invention. As shown in FIG. 6, SoC 500 can be any type of SoC for implementation into various types of platforms, ranging from relatively small low power portable devices such as smartphones, personal digital assistants (PDAs), tablet computers, netbooks, Ultrabooks™ and so forth, to more advanced SoCs that can be implemented in higher level systems.

As seen in FIG. 6, SoC 500 may include one or more cores $510_0$-$510_n$. Thus in various embodiments, a multicore SoC is possible, where the cores all may be homogeneous cores of a given architecture, e.g., an in-order or out-of-order processor. Or there can be heterogeneous cores, e.g., some relatively small low power cores, e.g., of an in-order architecture, with additional cores present that may be of a larger and more complicated architecture, e.g., an out-of-order architecture. A protocol stack enables communication of data between one or more of these cores and other components of a system. As seen, this stack can include software 515, which may be higher level software such as OS, firmware, and application level software that executes on one or more of the cores. In addition, the protocol stack includes a transaction layer 520 and a data link layer 530. In various embodiments, these transaction and data link layers may be of a given communication protocol such as a Peripheral Component Interconnect Express (PCI Express™ (PCIe™)) communication protocol in accordance with links based on the PCI Express™ Specification Base Specification version 3.0 (published Nov. 18, 2010). Of course, layers of different protocol stacks such as in accordance with a USB protocol stack may be present in other embodiments. Also, in some implementations low power PHY circuitry as described herein can be multiplexed with existing alternate protocol stacks.

Still referring to FIG. 6, in turn this protocol stack can couple to a physical unit 540 that may include multiple physical units that can provide for communication via multiple interconnects. In one embodiment, a first physical unit 550 may be a low power PHY unit that in one embodiment may correspond to an M-PHY in accordance with the M-PHY Specification Version 1.00.00—8 Feb. 2011 (MIPI Board Approved 28 Apr 2011) of the Mobile Industry Processor Interface (MIPI) Alliance (hereafter MIPI specification) to provide communication via a primary interconnect 580. In addition, a sideband (SB) PHY unit 244 may be present. In the embodiment shown, this sideband PHY unit may provide for communication via a sideband interconnect 270, which may be a consolidated sideband to provide certain sideband information, e.g., at slower data rates than primary interconnect 580 that is coupled to first PHY 550. In some embodiments, the various layers of the protocol stack can have a separate sideband coupling to this SB PHY 544 to enable communication along this sideband interconnect.

In addition, PHY unit 540 may further include an SB link manager 542 that can be used to control SB PHY 544. In addition, a link training and state manager 545 may be present and can be used to adapt the protocol stack, which is of a first communication protocol, to first PHY 550, which is of a second communication protocol, as well as providing overall control of first PHY 550 and interconnect 580.

As further seen, various components may be present in first PHY 550. More specifically, transmitter and receiver circuitry (namely TX 553 and RX 554) may be present. In general, this circuitry may be used to perform serialization operations, deserialization operations along with the transmission and receipt of data via primary interconnect 580. A save state manager 551 may be present and can be used to save a configuration and other state information regarding first PHY 550 when it is in a low-power state. Also, a coder 552 can be present to perform line coding, e.g., according to an 8 b/10 b protocol.

As further seen in FIG. 6, a mechanical interface 558 may be present. This mechanical interface 558 may be a given interconnection to provide communication from root complex 500, and more specifically to/from first PHY 550 via primary interconnect 580. In various embodiments, this mechanical connection can be by way of pins of the semiconductor device such as a ball grid array (BGA) or other surface mount, or plated through hole connection.

In addition to these main communication mechanisms, an additional communication interface may be by way of a LPS PHY unit 555, coupled via a separate stack including a software layer 516, a transaction layer 521, and a link layer 531 between cores 510 and one or more off-chip devices 560a-c along an LPS multi-drop interconnect 559. These devices, which can be various low data rate peripheral devices such as sensors, accelerometers, temperature sensors, global positioning system (GPS) circuitry, compass circuitry, touchscreen circuitry, keyboard circuitry, mouse circuitry and so forth, may thus communicate according to the protocol described herein.

Note that in various embodiments, both the sideband interconnect 570 and primary interconnect 580 can couple between SoC 500 and another semiconductor component, e.g., another IC, such as a multi-band radio solution.

Figure 7:
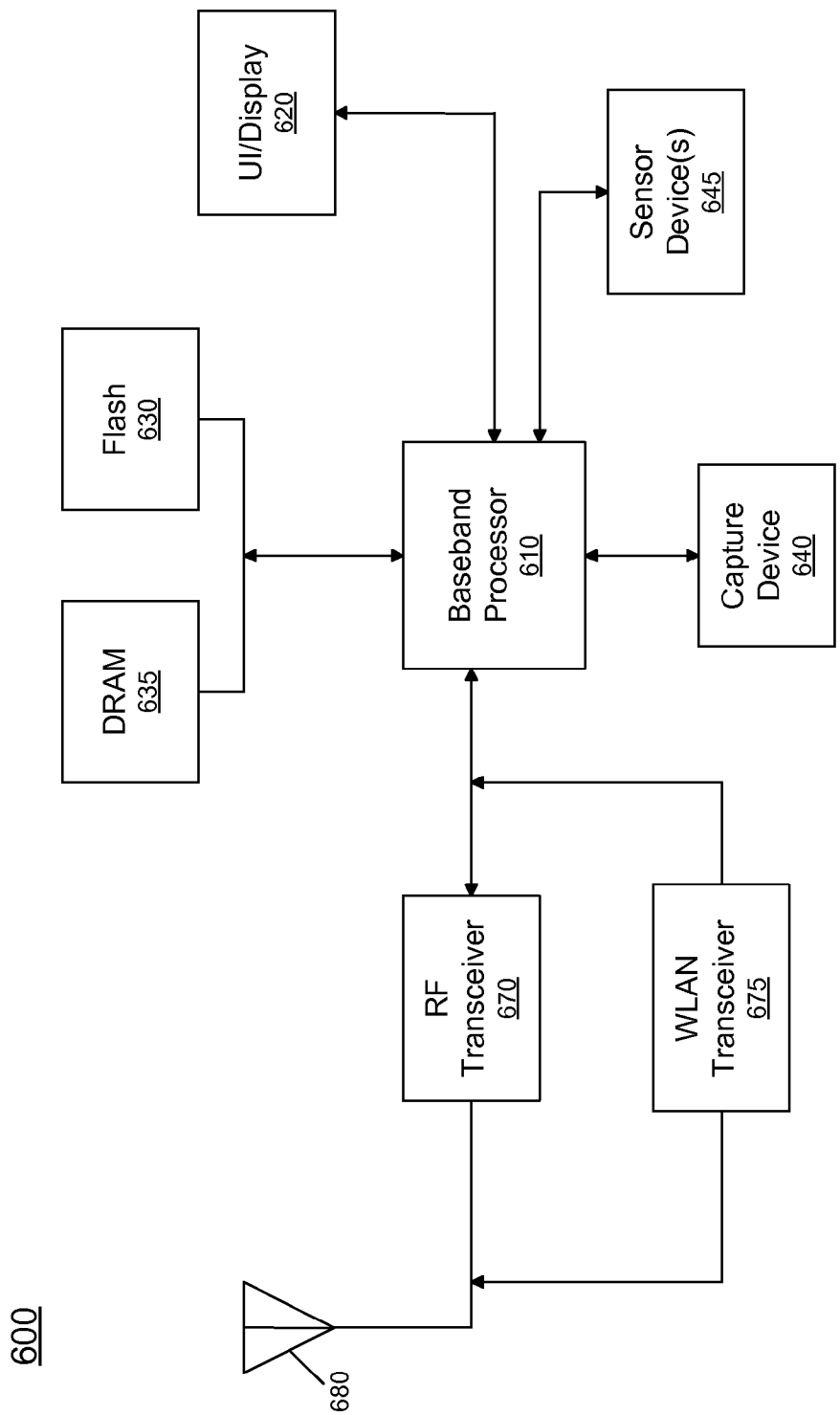
FIG. 7 is a block diagram of an example system with which embodiments can be used.

Embodiments thus can be used in many different environments. Referring now to FIG. 7, shown is a block diagram of an example system 600 with which embodiments can be used. As seen, system 600 may be a smartphone or other wireless communicator. As shown in the block diagram of FIG. 7, system 600 may include a baseband processor 610 which may be a multicore processor that can handle both baseband processing tasks as well as application processing. Thus baseband processor 610 can perform various signal processing with regard to communications, as well as perform computing operations for the device. In turn, baseband processor 610 can couple to a user interface/display 620 which can be realized, in some embodiments by a touch screen display. In addition, baseband processor 610 may couple to a memory system including, in the embodiment of FIG. 7 a non-volatile memory, namely a flash memory 630 and a system memory, namely a dynamic random access memory (DRAM) 635. As further seen, baseband processor 610 can further couple to a capture device 640 such as an image capture device that can record video and/or still images. Baseband processor 610 can further couple to one or more sensor devices 645, e.g., via an LPS interconnect as described herein.

To enable communications to be transmitted and received, various circuitry may be coupled between baseband processor 610 and an antenna 680. Specifically, a radio frequency (RF) transceiver 670 and a wireless local area network (WLAN) transceiver 675 may be present. In general, RF transceiver 670 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 675, local wireless signals, such as according to a Bluetooth™ standard or an IEEE 802.11 standard such as IEEE 802.11a/b/g/n can also be realized. Note that the link between baseband processor 610 and one or both of transceivers 670 and 675 may be via a low power converged interconnect that combines and maps functionality of a PCIe™ interconnect and a low power interconnect such as a MIPI interconnect. Although shown at this high level in the embodiment of FIG. 7, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
  a host controller including a transmit logic to prepare data into a data packet for communication along an interconnect and to transmit the data packet, the data packet including a preamble portion having a first predetermined value, a content portion including the data and having a plurality of symbols each including a start bit separate from the data, an error detection portion including an inverted version of the content portion, and a postamble portion having a second predetermined value.

2. The apparatus of claim 1, wherein the host controller is to allow for an idle state on the interconnect after communication of the data packet.

3. The apparatus of claim 1, wherein the content portion is according to an encoding scheme that encodes a first byte and a first start bit within a first symbol of the content portion and a second byte and a second start bit having a different value than the first start bit within a second symbol of the content portion.

4. The apparatus of claim 1, wherein the interconnect is to couple to a plurality of devices via a data link, a clock link, and a plurality of termination/pull up impedance links.

5. The apparatus of claim 4, wherein the host controller is to cause a first termination/pull up impedance link to couple to a supply voltage when the host controller is in an idle state.

6. The apparatus of claim 4, wherein the transmit logic is to retransmit the data packet after a predetermined number of symbols if the host controller does not receive an acknowledgment of the data packet from at least one of a plurality of devices coupled to the interconnect.

7. The apparatus of claim 1, wherein the data packet includes a first start bit prior to the preamble portion and a second start bit following the preamble portion, the second start bit having a different value than the first start bit.

8. The apparatus of claim 1, wherein the host controller includes a plurality of ports including:
   a first port to communicate with a hub device, the hub device to interface with a first plurality of universal serial bus (USB) devices;
   a second port to communicate with a second plurality of devices having a bandwidth less than a first value; and
   a third port to communicate with a third plurality of devices having a bandwidth greater than the first value.

9. The apparatus of claim 1, wherein the host controller is to receive a second data packet via the interconnect, and determine a collision of the second data packet and another data packet based on a comparison of a content portion and an error detection portion of the second data packet.

10. A method comprising:
    receiving data in a transmission logic of a host controller;
    generating a content portion of a data packet based on the data;
    generating an error detection portion of the data packet based on the content portion; and
    forming the data packet including a preamble portion, the content portion, the error detection portion, and a postamble portion.

11. The method of claim 10, further comprising communicating the data packet along an interconnect coupled to the host controller via a physical unit of the host controller.

12. The method of claim 11, further comprising providing an idle time of at least a predetermined period after communicating the data packet and prior to communicating a second consecutive data packet following the data packet.

13. The method of claim 10, wherein forming the packet further includes inserting a first start bit prior to the preamble portion.

14. The method of claim 13, wherein forming the data packet further includes inserting a second start bit following the preamble portion, the second start bit having a different value than the first start bit.

15. The method of claim 14, wherein forming the data packet further includes inserting a third start bit following the content portion and a fourth start bit following the error detection portion.

16. The method of claim 15, further comprising forming the preamble portion with a first predetermined value and forming the postamble portion with a second predetermined value.

17. A system comprising:
    a transmitter including a transmission logic to receive data and to prepare a data packet therefrom for communication along an interconnect, the data packet including a first start bit, a preamble portion having a first predetermined value, a second start bit having a different value than the first start bit, a content portion including the data represented by a plurality of symbols each including a start bit and a portion of the data, a third start bit, an error detection portion including an inverted version of the content portion, a fourth start bit, and a postamble portion having a second predetermined value;
    a serial interconnect coupled to the transmitter; and
    a receiver coupled to the serial interconnect and including a receiver logic to receive and process the data packet to obtain the data.

18. The system of claim 17, wherein the transmitter comprises a sensor to provide the data comprising sensor information, the receiver comprising a system-on-a-chip (SoC).

19. The system of claim 17, further comprising a primary interconnect to couple the transmitter to the receiver, wherein the serial interconnect comprises a sideband channel to communicate sideband information.

20. The system of claim 17, wherein the transmission logic is to encode a first byte of the data and an initial start bit within a first symbol of the content portion and encode a second byte of the data and a subsequent start bit having a different value than the initial start bit within a second symbol of the content portion.

* * * * *